Figure 1:
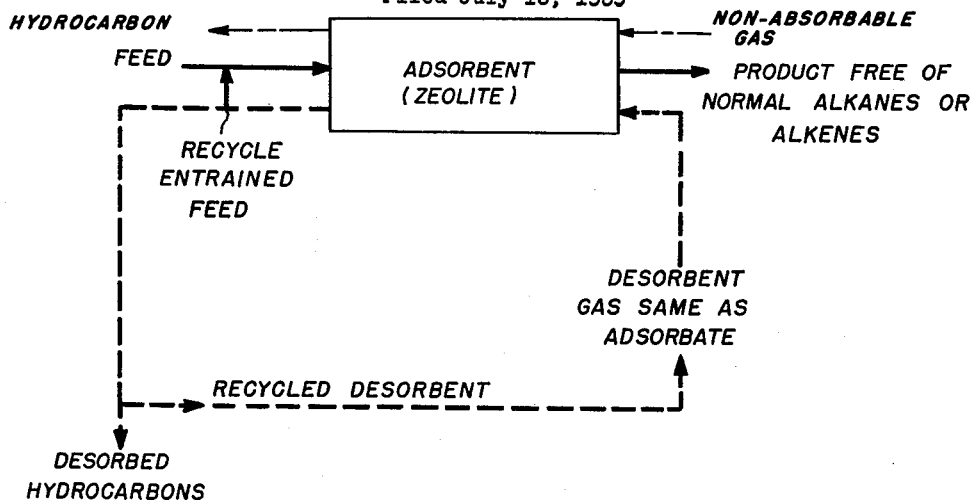

March 26, 1963

H. A. LINDAHL 3,083,245

PROCESS FOR DESORBING SOLID ADSORBENTS

Filed July 13, 1959

INVENTOR.
HAROLD A. LINDAHL
BY
ATTORNEY

United States Patent Office 3,083,245
Patented Mar. 26, 1963

3,083,245
PROCESS FOR DESORBING SOLID ADSORBENTS
Harold A. Lindahl, Riverside, Ill., assignor to The Pure Oil Company, Chicago, Ill., a corporation of Ohio
Filed July 13, 1959, Ser. No. 826,608
4 Claims. (Cl. 260—676)

This invention relates to a process for separating normal aliphatic hydrocarbons from admixture with cyclic and/or branched-chain hydrocarbons. More particularly, this invention is concerned with a process in which a hydrocarbon feed in the gas phase is passed over a solid selective adsorbent for normal aliphatic hydrocarbons which adsorbs said normal aliphatic hydrocarbons to the exclusion of branched-chain isomers and cyclic hydrocarbons. This invention is further concerned with an improved process for the desorption of normal aliphatic hydrocarbons from a solid selective adsorbent using the superheated vapors of the same hydrocarbon as a desorbing agent.

In recent years a number of processes have been developed for the separation of specific hydrocarbons from hydrocarbon mixtures by means of so-called "molecular sieves." Molecular sieves are solid adsorbents, e.g., natural and synthetic zeolites, which have a crystalline structure and pores of very small size which admit molecules of one particular size or configuration and exclude other molecules. The molecular sieves are the products of the Linde Air Products Company. The Linde type 5A molecular sieve is a sodium calcium aluminosilicate having a pore size of about 5 Angstrom units, which is sufficiently large to admit low-molecular-weight, straight-chain aliphatic hydrocarbons (alkanes, alkenes, and alkynes), but substantially excludes branched-chain aliphatic hydrocarbons and aromatic or other cyclic hydrocarbons. While the molecular sieve type adsorbents have been successful in achieving sharp separations between normal and branched aliphatic hydrocarbons, and between normal aliphatic and aromatic hydrocarbons, these adsorbents have not gained rapid commercial acceptance because of difficulties and cost associated with their regeneration, i.e., with the removal of adsorbed hydrocarbons from the solid adsorbent. Several methods have been suggested for accomplishing regeneration. For example, desorption has been carried out with superheated steam. Also, hydrocarbons have been desorbed from zeolite-type adsorbents with other heated stripping gases such as nitrogen or helium. Ballard et al. in U.S. Patent 2,818,455 describe the use of hydrocarbons having three or more carbon atoms per molecule, at temperatures greater than their critical temperatures, as desorbents for recovering adsorbed hydrocarbons from zeolite adsorbents. However, in all of the prior art regeneration methods, the desorbed straight-chain hydrocarbons are evolved from the bed of adsorbent in mixture with the desorbing fluid, and further separation of this mixture, as by distillation, fractional condensation, etc., is required.

It is therefore one object of this invention to provide a new and improved method for separation of hydrocarbons by successive adsorption and desorption on a solid selective adsorbent.

Another object of this invention is to provide an improved method for the selective adsorption of straight-chain hydrocarbons from a hydrocarbon mixture containing the same followed by desorption of the adsorbed hydrocarbons.

Another object of this invention is to provide an improved process for the desorption of straight-chain hydrocarbons adsorbed on a solid selective adsorbent which avoids the necessity of separating the evolved hydrocarbons from the desorbent material.

A feature of this invention is the provision of an improved process in which a mixture of straight-chain hydrocarbons and non-straight-chain hydrocarbons is passed over a solid selective adsorbent until the adsorbent is saturated with straight-chain hydrocarbons, after which the saturated adsorbent is subjected to a higher temperature using the superheated vapors of the same straight-chain hydrocarbons as a desorbing agent.

Other objects and features of this invention will become apparent from time to time throughout the specification and claims as hereinafter related.

This invention comprises a new and improved process in which a mixture of straight-chain hydrocarbons and non-straight-chain hydrocarbons is contacted with a solid selective adsorbent having a pore size such that the straight-chain hydrocarbons are admitted and the non-straight-chain hydrocarbons are excluded. Such a solid selective adsorbent (preferably a "molecular sieve") is effective in separating normal aliphatic hydrocarbons from branched isomers and from cyclic hydrocarbons. When the adsorbent has become saturated with respect to the straight-chain hydrocarbons, the adsorbent is swept with the superheated vapors of the same hydrocarbon which has been adsorbed, but at a substantially higher temperature than that used during the adsorption. This desorption step is continued until the hydrocarbon content of the adsorbent is reduced to the equilibrium value for the desorption temperature. In using the same hydrocarbon as the desorbing agent, it is possible to recover the adsorbate without the necessity of separating the adsorbate from the desorbing agent.

Figure 2:
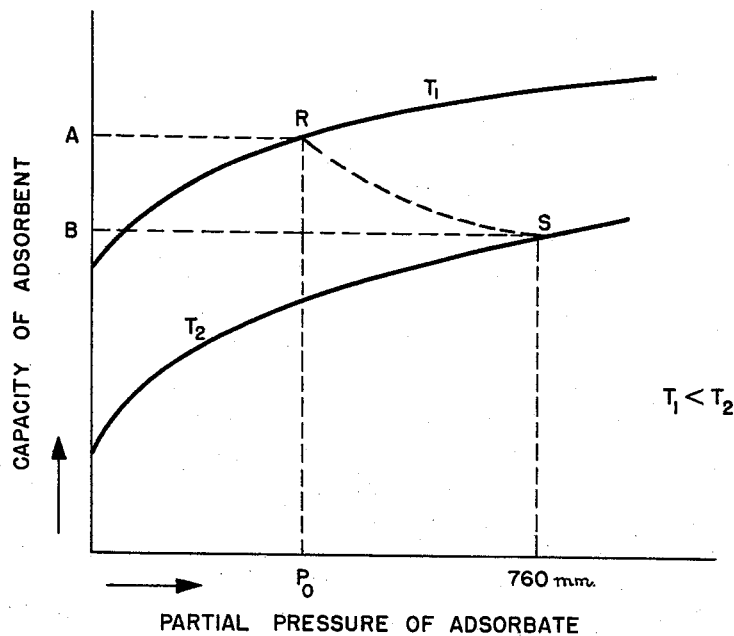

In the accompanying drawing, there is shown in FIG. 1 a flow diagram of this process illustrating both the adsorption and desorption steps, and in FIG. 2 there are shown pressure-temperature curves which illustrate the principles underlying this invention.

In carrying out this invention any suitable adsorbent can be used, but the invention is preferably carried out with solid zeolites having a pore size such that normal aliphatic hydrocarbons are adsorbed to the exclusion of branched isomers and cyclic hydrocarbons. For separating low-molecular weight-alkanes, alkenes, and alkynes, the preferred adsorbent is a Linde 5A molecular sieve. For any specific, straight-chain, aliphatic hydrocarbon, the zeolite adsorbent has a specific capacity related to the temperature and the partial pressure of the hydrocarbon in the fluid mixture in contact with the solid. This is shown schematically in FIG. 2. It is apparent that the capacity of the adsorbent decreases as the temperature increases and/or as the partial pressure of the hydrocarbon in the mixture decreases (in general, these relationships also hold true for other adsorbents and adsorptive separations). In this process, I take advantage of these relationships, particularly of the temperature effect on capacity, and use as the desorbing fluid the same compound which is contained in the zeolite adsorbent, but in the form of a superheated vapor at a temperature greater than the temperature at which absorption occurred. After removing a substantial portion of the adsorbed hydrocarbon from the zeolite adsorbent, the interstitial vapors are swept from the adsorbent bed by means of a gas which is not adsorbed by the zeolite. The zeolite is cooled to a lower (adsorption) temperature while it is in contact with this sweep gas, and introduction of the mixed hydrocarbon feed is resumed. Alternatively, after the desorption period, the adsorbent bed may be swept and cooled by introduction of the feed stock mixture at a lower temperature.

By way of example, a feed stock containing normal pentane at a partial pressure $P_0$ is passed through a bed of zeolite (Linde 5A molecular sieve) at a total pressure equal to atmospheric and at temperature $T_1$. This is continued until the composition of the effluent vapors from the bed becomes the same as the composition of the inlet vapors, indicating that the adsorptive capacity of the bed has been satisfied, i.e., the bed has become "saturated." When this condition has been reached, the adsorbent is saturated with normal pentane in amount A (see FIG. 2) in units of adsorbate per unit of adsorbent, and condition R on curve $T_1$ exists. At this point, the introduction of the feed mixture is terminated and normal pentane at temperature $T_2$ is introduced.

The first effluent issuing from the adsorbent bed after introduction of the normal pentane is started is the unseparated feed stock contained in the interstitial voids of the bed at the termination of the adsorption period. This mixture is returned, preferably via a "surge tank," to the feed entry line for eventual recycle. As the introduction of hot normal pentane continues, the effluent becomes substantially pure normal pentane, a portion of which is conducted directly to product storage. The amount of pentane which is removed to storage corresponds to the amount which is desorbed from the zeolite bed. The remainder of the hot pentane effluent is recycled through the bed to desorb more of the adsorbed normal pentane. It is apparent that as the bed becomes heated to temperature $T_2$, the capacity of the bed approaches condition S (temperature $T_2$, partial pressure 760 mm., and capacity B) in FIG. 2. The amount of normal pentane issuing from the bed during this desorption period is greater than the amount introduced by an amount equal to A—B per unit amount of zeolite adsorbent. This amount (A—B) is realized as the net product. It is apparent that no separation of desorbing and desorbed fluids is necessary as is required when an inert gas, such as nitrogen or helium, is used and no fractional distillation is required as when a different hydrocarbon is used as the desorbent.

When the entire zeolite bed has reached condition S (in FIG. 2), the introduction of hot normal pentane is terminated, and the interstitial normal pentane is displaced by introducing a hot non-adsorbable fluid (e.g., helium), at temperature $T_2$. Then the bed is cooled to temperature $T_1$ by introducing cool non-adsorbable fluid (e.g., helium), after which the introduction of the hydrocarbon feed mixture is resumed. It appears that the greatest efficiency can be achieved by using the hydrocarbon feed stock at a temperature slightly less than temperature $T_1$ as the displacing and cooling fluid after completion of the desorption step. When this is done, the conditions in the bed oscillate between points R and S (in FIG. 2), and there is no possibility of contamination of either the normal or isomeric products by the displacing, cooling, or heating fluids.

The following non-limiting examples are illustrative of this invention.

Example I

A cylindrical column containing a fixed adsorbent bed comprising 1,500 g. of 1/16" pellets of Linde 5A molecular sieve (a calcium aluminosilicate having a crystalline structure with pore diameters of about 5 Angstrom units) is contacted with a vaporized mixture of isomeric pentanes consisting of 60% vol. n-pentane and 40% vol. isopentane, at a temperature of 150° F., at substantially atmospheric pressure, and at a weight, hourly space velocity of about 1.0. The effluent from the adsorbent bed consists of 4% vol. n-pentane, and 96% vol. isopentane. By passing the feed stock through a series of adsorption columns, it is possible to obtain an effluent which consists of substantially pure isopentane. At the end of about 7 minutes, the composition of the effluent from the adsorption column again is 60% vol. normal pentane and 40% vol. isopentane, thus indicating that the adsorbent has become saturated with n-pentane. At this time, the mixed pentane feed is switched to another adsorption column and the desorption of n-pentane from the molecular sieves is initiated. The desorbed normal pentane may be recycled to a suitable isomerization process for conversion to isopentane. In desorbing the n-pentane from the molecular sieves hot n-pentane gas at a temperature of 550° F. and a pressure of slightly above 760 mm. Hg is passed through the adsorbent. As the adsorbent bed is heated to the temperature of the desorbent gas, the adsorbed n-pentane is evolved and swept from the column. The initial effluent from this desorption step contains some isopentane which was entrained interstitially in the adsorbent bed, and this initial effluent may be mixed with the hydrocarbon feed for use in a subsequent adsorption cycle. After the initial mixed effluent has been evolved from the column, the effluent consists of pure n-pentane. A portion of this effluent is condensed and recovered, as indicated in FIG. 1, in an amount corresponding to the amount of n-pentane desorbed. The remainder of the hot n-pentane effluent is recirculated through the adsorbent material until the adsorbent reaches the temperature of the hot desorbent gas, and is at the equilibrium condition for that temperature. At this point, the desorption step is terminated and the mixed pentane feed is introduced at a temperature of 200° F. In carrying out the desorption step, it should be noted that when a number of adsorption columns are used in series during the adsorption portion of the process, the desorption of n-pentane from the columns may be accomplished by passing the hot pentane gas as a desorbing fluid through the columns either singly or in series. The partial pressure of the normal pentane in the charge gas is about 8.9 p.s.i.a. The equilibrium amount of pentane adsorbed at this pressure and at 150° F. (point R) is about 10.5 lbs. per 100 pounds of adsorbent. The normal pentane equilibrium content at the desorbing conditions (point S), 550° F. and 14.7 p.s.i.a. partial pressure, is about 5 lbs. per 100 pounds of adsorbent. Thus, the net normal pentane product is 5.5 lbs. per 100 lbs. of adsorbent.

Example II

A cylindrical column containing about 1500 g. of 1/8" pellets of a zeolite adsorbent (viz., Linde 5A molecular sieve) is used for separating n-hexane from admixture with cyclohexane and benzene. A mixture consisting of 52% vol. n-hexane, 43% vol. cyclohexane, and 5% vol. benzene, is passed through the adsorption column at a temperature of 200° F., at atmospheric pressure, and at a weight hourly space velocity of 0.9. The effluent from the adsorption column contains 0.5% n-hexane, 88.5% cyclohexane and 11.0% benzene. The hydrocarbon feed can be completely dehexanized by passing it through a series of columns. At the end of 7 minutes, the effluent from the adsorption column again contains 52% vol. n-hexane, 5% vol. benzene, and 43% vol. cyclohexane, thus indicating that the adsorbent has become saturated with n-hexane.

At this point, the mixed hydrocarbon feed is switched to another adsorption column, or series of columns, and the n-hexane is recovered from the adsorbent. n-Hexane, at a temperature of 550° F., a pressure of slightly above 760 mm. Hg, is circulated over the saturated adsorbent. As in the preceding example, the first effluent issuing from the adsorbent bed contains some benzene and cyclohexane which was entrained in the bed, in addition to the n-hexane. This initial effluent is returned, preferably via a "surge tank," to the feed entry line for eventual recycle. As the introduction of hot n-hexane continues, the effluent becomes substantially pure n-hexane, a portion of which is condensed and recovered. The amount of n-hexane condensed and recovered corresponds to the amount which is desorbed from the zeolite bed, while the balance of the n-hexane effluent is recycled for desorption of more of the adsorbate. As the bed becomes heated to the temperature of the desorbent gas, the zeolite adsorbent gives up all of the n-hexane in excess of the amount which can be held under equilibrium conditions for that temperature. As in the preceding example, the use of superheated vapors of the adsorbed hydrocarbon is very effective in desorbing the hydrocarbon from the zeolite adsorbent since it completely eliminates the problem of separation of the hydrocarbon from the desorbing fluid. At the end of the desorption cycle, the flow of desorbing gas is terminated and the mixture of $C_6$ hydrocarbons is introduced into the adsorption column at a temperature of 200° F. to cool the adsorbent to the initial adsorption temperature. The normal hexane partial pressure in the charge gas is 7.6 p.s.i.a. The equilibrium amount of normal hexane absorbed at this pressure and at 200° F. (point R) is 11 lbs. per 100 pounds of adsorbent. The normal hexane equilibrium content at the desorbing conditions (point S), 550° F. and 14.7 p.s.i.a. partial pressure, is about 6.6 lbs. per 100 pounds of adsorbent. Thus, the net normal hexane product is 4.4 lbs. per 100 pounds of adsorbent.

While this invention has been described with specific reference to the use of "molecular sieves" as the adsorbent, it should be noted that the process may be carried out with any selective adsorbent. It should also be noted that this process is applicable both to individual adsorption columns and to adsorption columns which are connected in series to provide complete adsorption of a particular component of the feed stock. While this invention has been described with special emphasis upon the adsorption of n-pentane and n-hexane from admixture with other hydrocarbons, it should be noted that the process is applicable to any mixtures of low-molecular-weight aliphatic hydrocarbons, whether saturated or unsaturated, with cyclic and/or branched-chain hydrocarbons, whether of the same or different molecular weight. The "molecular sieves" are particularly useful in the separation of low-molecular-weight alkanes, alkenes and alkynes from cyclic and branched-chain hydrocarbons, where the aliphatic hydrocarbon contains from 4 to 9 carbon atoms per molecule.

While this invention has been described fully and completely with special emphasis upon several preferred embodiments thereof, in compliance with the patent laws, it should be understood that within the scope of the appended claims this invention may be practiced otherwise than as specifically described herein.

What is claimed is:
1. In a method of separating a low-molecular-weight normal aliphatic hydrocarbon from a feed mixture containing same and other hydrocarbons, selected from the group consisting of branch-chain hydrocarbons, cyclic hydrocarbons, and mixtures thereof, in which said feed mixture is passed through a zeolitic molecular sieve selective for normal aliphatic hydrocarbons, at a first temperature, whereby said normal aliphatic hydrocarbon is selectively adsorbed until said sieve is at said first temperature and saturated to equilibrium capacity at said first temperature, and desorbing said sieve by sweeping said sieve with the superheated vapors of the same hydrocarbon which is adsorbed, at a second temperature higher than said first temperature, whereby the temperature of said sieve is increased to said second temperature, until said sieve is saturated to equilibrium capacity at said second temperature, the improvement which comprises desorbing said sieve immediately after the passage of said feed mixture therethrough, mixing the initial effluent from the desorption step with further feed mixture until the desorption effluent is the hydrocarbon which is adsorbed substantially free of other hydrocarbons of said feed mixture, recovering from the desorption effluent the hydrocarbon which is adsorbed in an amount corresponding to the difference in equilibrium capacities of said sieve at said first and second temperatures, displacing interstitial hydrocarbons from the desorbed sieve by passing through said sieve a non-adsorbable gas heated to substantially said second temperature, cooling said sieve by passing a cool, non-adsorbable gas through said sieve, the same gas being utilized for displacing interstitial hydrocarbons and cooling said sieve, and contacting said sieve with additional quantities of said feed mixture.

2. A method in accordance with claim 4 in which said sieve has a pore size of about 5 Angstrom units.

3. A method in accordance with claim 1 in which the sieve is a solid material having a pore size which admits the molecules of the adsorbed hydrocarbon and excludes cyclic and branched-chain hydrocarbons.

4. A method in accordance with claim 3 in which the adsorbed hydrocarbon is selected from the group consisting of $C_4$—$C_9$ alkanes, alkenes, and alkynes.

References Cited in the file of this patent

UNITED STATES PATENTS

| | | |
|---|---|---|
| 2,899,474 | Ricards | Aug. 11, 1959 |
| 2,901,519 | Patterson et al. | Aug. 25, 1959 |
| 2,920,038 | Feldbauer et al. | Jan. 5, 1960 |
| 2,921,026 | Fleck et al. | Jan. 12, 1960 |
| 2,935,467 | Fleck et al. | May 3, 1960 |
| 2,963,519 | Kasperik et al. | Dec. 6, 1960 |
| 2,966,531 | Louis | Dec. 27, 1960 |
| 2,978,407 | Tuttle et al. | Apr. 4, 1961 |